United States Patent [19]

Bailly

[11] Patent Number: 4,459,644

[45] Date of Patent: Jul. 10, 1984

[54] LIGHTS FOR AUTOMOBILE VEHICLES

[75] Inventor: François Bailly, Neuilly S. Seine, France

[73] Assignee: Equipements Automobiles Marchal, Issy-les-Moulineaux, France

[21] Appl. No.: 489,119

[22] Filed: Apr. 27, 1983

[30] Foreign Application Priority Data

May 4, 1982 [FR] France ........................ 82 07737

[51] Int. Cl.3 ........................ B60Q 1/00

[52] U.S. Cl. ........................ 362/80; 362/83; 362/230; 362/240; 362/241; 362/249; 362/267; 362/293; 362/307; 362/308; 362/310; 362/368; 362/375

[58] Field of Search ........................ 362/80, 83, 240, 241, 362/230, 249, 267, 293, 307, 308, 310, 368, 375

[56] References Cited

U.S. PATENT DOCUMENTS 3,487,206 12/1969 Dawson .
3,617,795 11/1971 Peek ........................ 315/83 X
4,214,168 7/1980 Kulka ........................ 362/311

FOREIGN PATENT DOCUMENTS 1259747 9/1954 Fed. Rep. of Germany .

*Primary Examiner*—Stephen J. Lechert, Jr.
*Attorney, Agent, or Firm*—McCormick, Paulding & Huber

[57] ABSTRACT

The present invention relates to lights for automobile vehicles. The present invention proposes a light which comprises an elliptical mirror associated with a lamp to form a light-emitting device supported on the inner face of a piece of bodywork of the vehicle in a position such that the filament of the lamp is substantially disposed at the first focus of the elliptical mirror, while the other focus of the elliptical mirror merges substantially with an orifice provided in said piece of bodywork; the dimensions of this orifice, while being small with respect to the surface circumscribed on the piece of bodywork by the reflector, are defined so that virtually all the beam reflected by the elliptical mirror emerges from the light; a globe is fixed on the outer face of said piece of bodywork, opposite the reflector.

11 Claims, 1 Drawing Figure

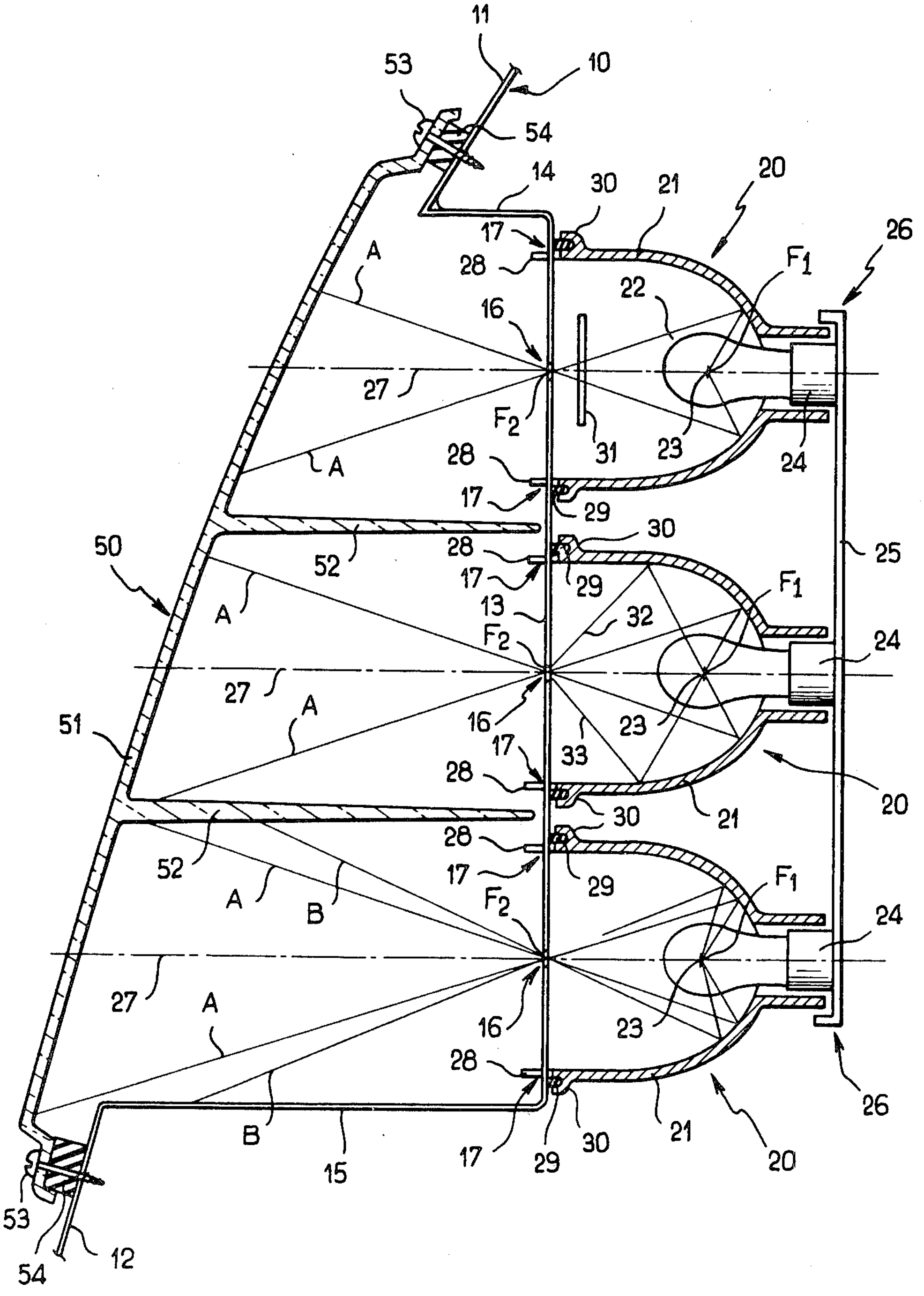
11
10
53
54
14
17
28
16
27
F2
A
30
21
20
26
F1
22
23
24
31
29
50
52
13
32
25
51
33
12
15
B

LIGHTS FOR AUTOMOBILE VEHICLES

The present invention relates to lights of automobile vehicles.

Conventional lights for automobile vehicles are composed of a sealed beam unit which comprises at least one light-emitting lamp, a reflector device disposed to the rear of each lamp and adapted to take up the major part of the light flow emitted thereby and to return this light flow towards the front of the light, as well as a translucent globe mounted in front of the lamp.

It has been observed, for a long time, that, under unfavourable conditions, such conventional lights may be struck by ambient light rays, for example the sun's rays, in such a manner that, when the light is extinguished, these rays are reflected by the reflector device and emerge from the light in the form of a coloured beam. This phenomenon will hereinafter be referred to as the "ghost lighting effect".

From the practical point of view, it has been observed that such effects can be dangerous when driving, as they deceive the other drivers.

From the aesthetic standpoint, such effects are also detrimental: for the automobile designer, it is desirable that an extinguished light be neutral in colour, if the ideal colour, that of the bodywork, is not possible.

Numerous light structures have already been proposed to overcome the above-mentioned drawbacks.

In particular, French Pat. No. 1 364 413 proposes sealed beam unit structures which comprise an ellipsoidal reflector having foci $F_1$ and $F_2$, a lamp whose filament is centred on the focal point $F_1$ of the reflector, a deflector disposed in front of the lamp, and provided with an opening concentric with respect to the axis of the ellipsoidal reflector, and placed at the focal point $F_2$ of the reflector, as well as an outer globe. A coloured translucent piece, intended to colour the beam emitted when the filament is supplied, is preferably disposed inside the light. Such a proposition makes it possible correctly to avoid the "ghost lighting effects" mentioned above. In fact, when the light is extinguished, the light likely to strike the globe, i.e. the ambient light, will meet the deflector, after having passed through the globe. Consequently, only a very small part of these light rays can penetrate in the light through the opening provided in the deflector and in this way the light cannot appear to be lit up when the filament is not supplied; for any observer, such an extinguished light appears essentially in the form of the outer surface of the deflector. Such lights consequently emit a signalling light beam of a given colour when they are lit and are in a clearly different colour when the filament is no longer supplied.

However, such sealed beam units are relatively expensive to manufacture and to assemble on automobile vehicles. However "neutral" it is, the colour of their deflector does not always harmonize with that of the bodywork of the vehicles, and there could be no question, in practice, of making a whole range of sealed beam units of which the deflectors are coloured differently, corresponding to the range of bodywork colours.

Contrary to custom whereby a car lights are made in the form of sealed beam units before being installed on the bodywork of the vehicle, Applicant now proposes a novel light for automobile vehicle, which gives full satisfaction from the point of view of safety, aesthetics and economy. According to the invention, the reflector device, constituted by an elliptical mirror associated with a lamp, is mounted on the inner face of a piece of the bodywork of said vehicle, in a position such that the filament of the lamp is substantially disposed at the first focus of the elliptical mirror, whilst the other focus of the elliptical mirror merges substantially with an orifice provided in said piece of bodywork; the dimensions of this orifice, whilst being small with respect to the surface circumscribed on the piece of bodywork by the reflector, are defined so that virtually all the beam reflected by the elliptical mirror emerges from the light; the globe is fixed on the outer face of said piece of bodywork, opposite the reflector.

Such a light totally avoids the "ghost lighting effect," since the extinguished light appears like the outer surface of the piece of bodywork in question. Consequently, only a small part of the ambient light rays striking the globe can penetrate in the light through the orifice made in said piece of bodywork.

Moreover, it will be understood that the piece of bodywork performing the role of support for the car light, the latter proves to be particularly robust and reliable, whilst being extremely simple and rapid to instal. In addition, the most sensitive members of the light, namely the electrical connections, the lamp and the reflector, are disposed behind a piece of bodywork which comprises only orifices of small dimensions. For these reasons, said members are efficiently protected against the risks of penetration of damp which rapidly deteriorates said members, and in particular the reflector in the conventional sealed beam units.

Finally, from the point of view of colour, the extinguished light matches perfectly with the bodywork of the automobile vehicle, which is the optimum desired by the designers.

According to a first variant embodiment, the filament of the lamp is surrounded by a coloured filter.

According to another variant embodiment, the reflecting surface of the elliptical mirror is coloured.

According to another variant embodiment, a coloured translucent screen is provided in the vicinity of the orifice made in said piece of bodywork, on the lamp side.

An opaque screen is preferably provided at the front of the lamp, so as to occult the light beam emitted directly by said lamp towards the front of the light.

According to a variant embodiment, the light-emitting device constituted by an elliptical mirror associated with a lamp, is supported on the inner face of the piece of bodywork, so that the optical axis of the device is substantially perpendicular to said piece of bodywork.

According to a further variant embodiment, the light-emitting device, constituted by an elliptical mirror associated with a lamp, is supported on the inner face of the piece of bodywork, so that the optical axis of the light is oblique thereon.

The elliptical mirror is preferably formed by a portion of ellipsoid of revolution of which the axis of revolution corresponds to the axis of the light, and the orifice made in the piece of bodywork is circular in form.

In a variant, the elliptical mirror is in the form of an elongated envelope provided with two arms substantially in U form of which the cross section constitutes a portion of ellipse, and the orifice made in the piece of bodywork is elongated in form.

The present invention extends to lights for automobile vehicles comprising a plurality of reflector devices of the elliptical mirror type, each associated with a lamp to form elementary light-emitting devices, which are fixed on the inner face of a piece of bodywork of said vehicle, in a position such that the filament of each lamp is substantially disposed at the first focus of the elliptical mirror which is associated therewith, whilst the second focus of each of the elliptical mirrors merges substantially with an orifice provided in said piece of bodywork, the dimensions of this orifice, whilst being small with respect to the surface circumscribed on the piece of bodywork by the reflector, being defined so that virtually all the beam reflected by each elliptical mirror emerges from the light; a translucent globe further being fixed on the outer face of said piece of bodywork, opposite the reflectors.

The invention will be more readily understood on reading the following description with reference to the accompanying drawings, in which:

The single FIGURE shows a view in longitudinal axial section of a light according to the present invention.

Referring now to the drawings, the light according to the present invention is assembled on a piece of the bodywork referenced 10. More precisely, said piece of bodywork 10 defines a casing defined on the one hand by a generally flat wall 13, and of direction substantially oblique with respect to the general direction of the bodywork determined by the two portions 11 and 12 of bodywork shown, on the other hand by walls 14 and 15 perpendicular to the flat wall 13 mentioned above, and which each connect ends thereof to said portions 11 and 12.

According to the embodiment shown in the FIGURE, the light is composed of three elementary light-emitting devices 20 supported on the inner face of the bodywork wall 13. Each of these devices 20 is composed on the one hand of an elliptical mirror 21 associated with a lamp whose bulb has been schematically shown at 22. More precisely, the filament 23 of each lamp 22 is disposed at the first focus $F_1$ of the elliptical mirror 21 which is associated therewith, whilst the second focus $F_2$ of the elliptical mirror 21 merges substantially with an orifice 16 provided in the flat wall 13 of the bodywork.

The dimensions of this orifice 16, whilst being small with respect to the surface circumscribed on the wall 13 by the reflector 21 (to avoid a large quantity of light penetrating in the device), are defined so that virtually all the beam reflected by the elliptical mirror emerges from the light.

As shown in the FIGURE, the sockets 24 (shown schematically) of the lamps 22 are advantageously supported by a common bar 25, immobilized at 26 on the reflectors, in conventional manner known per se, for example by clipping. Of course, this bar 25 may be supported at the rear of the reflectors 21 with the aid of any appropriate conventional means. Similarly, each of said sockets 24 may be supported individually by the reflector 21 with which it is associated.

As shown in the FIGURE, each elliptical mirror 21 is supported at the rear of the wall 13 so that the optical axis 27 of each elementary device 20 is substantially perpendicular to this wall 13.

In a variant, the reflectors 21 may be supported at the rear of the wall 13 so that the optical axis 27 of each of the elementary devices is oblique with respect to said wall 13.

Of course, the elliptical mirrors 21 may be assembled on the wall 13 of the bodywork with the aid of any appropriate conventional means.

According to the embodiment shown in the FIGURE, the elliptical mirrors 21 are fixed in blister fashion on said wall 13. To this end, each elliptical mirror is provided with at least two catches 28 projecting with respect to the body of the mirror on the annular edge thereof, and substantially parallel to the optical axis (27) of the mirror. The catches 28 are adapted to be introduced into corresponding orifices 17 made in the wall 13 of the bodywork, so that, in the assembled state, the second focus $F_2$ of the mirror merges with precision with the opening 16 likewise provided in the wall 13 of the bodywork. The catches 28 are then riveted or fixed in blister fashion on the outer face of said bodywork wall 13. An O-ring 29 made of elastomer is preferably introduced, during assembly, in an annular groove 30 provided on the outer periphery of the mirror, in the vicinity of said annular edge thereof, as shown in the FIGURE. The purpose of such an O-ring is, on the one hand, to ensure a good seal of the system, aiming at protecting in particular the elliptical mirror 21 and the electrical connections arriving on the base of the lamp 22, and, on the other hand, to limit the vibrations of the vehicle transmitted to these elements.

Applicant has observed that such an assembly, made for example on a conventional assembly line, and in particular on a vehicle finishing line, gave full satisfaction; consequently, it was not necessary to proceed initially with the assembly and adjustment of a complete sealed beam unit in the workshop, before proceeding with assembly on the vehicle.

Applicant has observed in particular that the precision conventionally imposed on the vehicle assembly lines was quite satisfactory for proceeding with the perforation of the openings 16 and orifices 17 so as to ensure that the second focus $F_2$ of the elliptical mirror merges with the opening 16 in the assembled state, and thus that virtually all the light flow returned by the elliptical mirror 21 emerges from the light.

To emit a coloured radiation, each elementary light-emitting device (20) may comprise a coloured filter surrounding the bulb 22 of the lamp and fixed to the elliptical mirror 21 by any conventional means, the colour of the filter being chosen as a function of the desired colour of the beam emerging from the light.

According to another embodiment, coloration of the beam emerging from the light may be obtained by colouring the reflecting surface of the elliptical mirror 21.

According to another variant embodiment, there may be provided, in the vicinity of the opening 16 made in said wall 13, towards the elliptical mirror 21, a coloured translucent screen giving the colour provided for each signal emitted by the lamps 22, as schematically shown at 31 for one of the elementary light-emitting devices (20). Said screen must, of course, be supported by the refector 21.

According to another variant of the present invention, the coloured translucent screen is placed at the level of opening 16. This arrangement presents the advantage of perfecting the seal of each elementary light-emitting device 20 and in particular of substantially increasing the reliability of the elliptical mirrors 21, which, as has already been indicated, is an essential condition for good functioning of such lights.

Of course, coloration of the beam emerging from the light may also be obtained by using a lamp of which the glass is coloured.

The particular section of the opening 16 made in the wall 13 of the bodywork must be determined as a function of the particular form of the elliptical mirror 21.

In this way, insofar as this elliptical mirror is formed by a portion of ellipsoid of revolution, whose axis merges with the optical axis 27 of each elementary device, the beam reflected by this mirror will have an envelope of generally conical form defined in one plane by the two generatrices referenced 32 and 33 in the accompanying FIGURE, for the elementary central device, and the opening 16 in the wall 13 of the bodywork may be made simply in circular form.

However, this opening 16 may also be elongated, particularly in the form of a slot, for example, in the case of the mirror 21 being in the form of an envelope provided with two arms substantially in U form of which the cross section constitutes a portion of ellipse, such a mirror possessing rectilinear foci perpendicular to the optical axis 27 of each elementary light-emitting device 20.

Accessorily, each elementary device may also comprise an opaque screen or occulter (not shown in the FIGURE), between the lamp 22 and the opening 16 of the wall 13 of the bodywork. The function of this opaque screen is to intercept the light rays emitted by the filament 23 of the lamp 22 directly towards the front of the light.

Of course, this opaque screen may be of any appropriate form and be immobilized in front of the lamp 22 by any conventional means.

The light according to the present invention also comprises a translucent globe 50 on the outer face of the piece (11, 12) of bodywork, opposite the or each reflector.

This globe 50 is preferably colourless and advantageously comprises a plurality of prismatic elements (not shown in the FIGURE) adapted to render the outgoing beam homogeneous, ensuring a distribution of light which respects the conditions of standardization.

More precisely, according to the embodiment shown, the outer globe 50 is composed of an outer wall 51, slightly curved to harmonize with the lines of the bodywork, and of a plurality of webs 52, parallel to the optical axis (27) of the light in assembled position. Said webs 52 rigidify the globe 50 and define corridors for the outgoing beams referenced A-A from each of the elementary light-emitting devices. As shown in the FIGURE, it is, however, desirable that the orifice 16 made in the wall 13 of the bodywork not be too far from the surface of the globe 50 so that the major part of the light rays passing through the orifice 16 reaches the outer wall 51 of the globe 50. In the contrary case, part of the light rays (B) is occulted either by the wall (15) of the casing, or by one of the webs (52) of the globe, which reduces the angle of opening of the outgoing beam and possibly necessitates specific prismatic elements on the globe, to spread out the light beam.

According to the embodiment shown, the globe is fixed on the bodywork by means of screws 53 with the interposition of an O-ring 54 made of elastomer.

Numerous other variant embodiments may, of course, be adopted to fix the globe.

Functioning of the light will now be described in greater detail.

When a lamp 22 is lit, its filament 23 placed at the first focus $F_1$ of the elliptical mirror 21 which is associated therewith, emits light rays towards the elliptical mirror 21 which consequently focusses the major part of the light rays emitted by the lamp 22, at the level of the orifice 16 made in the wall 13 of the bodywork.

Virtually all of the beam passing through the second focus $F_2$ of the elliptical mirror 21 then reaches the globe 50 which, with the aid of the prismatic elements with which it is provided, ensures a light distribution of the beam which respects the conditions of standardization. The dimensions of the orifice 16 are therefore determined so that the bodywork performs virtually no direct role on the outgoing beam emitted by the filament 23 of the lamp 22.

On the other hand, when the light is extinguished, the light likely to strike on the globe, i.e. the light coming in principle from the sun and the clouds when the sky is overcast, will encounter the wall 13 of the bodywork, after having passed through the globe 50. Consequently, only a very small part of these light rays can reach the reflector 21 via the orifice 16.

It will therefore be readily understood that, for any observer, the extinguished light will appear in the same colour as the bodywork. The light is therefore perfectly integrated in the bodywork, which is desired by the designers.

The ghost lighting effect mentioned above, which is frequently observed with conventional sealed beam units, is therefore completely avoided. An appreciable aesthetic effect if further added by the continuity of the colour and the lines of the bodywork.

Consequently, the present invention makes it possible easily to make lights which emit a coloured or non-coloured light which is different from the apparent colour of the light in the extinguished state. Such a principle thus enables the lights of the vehicle to be rendered virtually invisible when they are extinquished, but also enables lights which, whilst presenting the same apparent colour, emit light rays of different colours, to be associated.

Of course, the present invention is not limited to the embodiments which have just been described, from which other embodiments may be envisaged without departing from the scope of the invention; in particular, there may be any number of elementary light-emitting devices 20 and the piece of bodywork in question may either be flat or curved, without necessarily presenting a casing.

Finally, it should be noted that the usual design of a light, wherein the globe and the base are very often assembled by welding, is much simplified according to the present invention. In particular, standard reflectors may be assembled on the bodywork of the vehicle, only the outer globe being adapted to the style and aesthetics of the individual vehicle.

What is claimed is:

1. In an automobile vehicle, a support piece of bodywork of said vehicle having an opening therethrough, an elliptical reflector device having two foci mounted on the inner face of said piece of bodywork so that the optical axis of said elliptical reflector device extends transversely to said piece of bodywork and so that one of the two foci of the elliptical reflector device substantially merges with said opening, a first holding means for securing said reflector device in position on said piece of bodywork, a lamp having a filament disposed within the elliptical reflector device on the inner face of said piece of bodywork so that the filament merges with the other focus of the elliptical reflector device, a globe supported on the outer face of said piece of bodywork opposite said elliptical reflector device, and a second holding means securing said globe in position, said opening provided in said piece of bodywork being small with respect to the surface circumscribed on the inner face of said piece of bodywork by said elliptical reflector device but allowing substantially all the beam reflected by the elliptical reflector device to emerge from said opening.

2. The system of claim 1 wherein the filament of the lamp is surrounded by a coloured filter.

3. The system of claim 1 wherein the reflecting surface of the elliptical reflector device is coloured.

4. The system of claim 1 wherein a coloured translucent screen is provided in the vicinity of the opening made in said piece of bodywork, between said filament and said opening.

5. The system of claim 1 wherein an opaque screen is provided between said filament and said opening to occult the light beam emitted directly by said filament toward the opening.

6. The system of claim 1 wherein the elliptical reflector device is formed by a portion of ellipsoid of revolution having an axis of revolution coaxial with said opening and transvere to said piece of bodywork and the opening in the piece of bodywork is circular in form.

7. The system of claim 1 wherein the elliptical reflector device is in the form of an elongated envelope provided with two arms substantially in U form of which the cross section constitutes a portion of an ellipse, and the opening made in the piece of bodywork is elongated in form.

8. The system of claim 1, wherein it comprises a plurality of reflector devices of the elliptical mirror type, each associated with a lamp to form elementary light-emitting devices which are fixed on the inner face of a piece of bodywork of said vehicle in a position such that the filament of each lamp is substantially disposed at the first focus of the elliptical mirror which is associated therewith, whilst the other focus of each of the elliptical mirrors merges substantially with an orifice provided in said piece of bodywork; the dimensions of this orifice, whilst being small with respect to the surface circumscribed on the piece of bodywork by the reflector, are defined so that virtually all the beam reflected by each elliptical mirror emerges from the light; and a translucent globe is fixed on the outer face of said piece of bodywork, opposite the reflectors.

9. The system of claim 1 in which said first holding means comprises orifices provided in said piece of bodywork, and catches projecting with respect to the body of said elliptical reflector device so as to enter said orifices.

10. The system of claim 1 in which said second holding means comprises screws for supporting said globe on the outer face of said piece of bodywork, and an O ring interposed between said globe and said piece of bodywork.

11. The system of claim 1 wherein said piece of bodywork has a plurality of openings therethrough a like number of elliptical reflector devices are supported on the inner face of said piece of bodywork with the respective optical axes of said elliptical reflector devices extending transversely to said piece of bodywork so that one of the two foci of the elliptical reflector devices respectively merges with one of said openings, and a like number of lamps each having a filament associated respectively with the elliptical reflector devices are supported on the inner face of said piece of bodywork, each filament merging with the other focus of the associated elliptical reflector device.

* * * * *